(12) United States Patent
Spangler

(10) Patent No.: US 11,299,359 B2
(45) Date of Patent: Apr. 12, 2022

(54) LAPPER ASSEMBLY

(71) Applicant: USNR, LLC, Woodland, WA (US)

(72) Inventor: Clinton Spangler, Mentor, OH (US)

(73) Assignee: USNR, LLC, Woodland, WA (US)

( * ) Notice: Subject to any disclaimer, the term of this patent is extended or adjusted under 35 U.S.C. 154(b) by 0 days.

(21) Appl. No.: 17/102,214

(22) Filed: Nov. 23, 2020

(65) Prior Publication Data

US 2021/0070570 A1 Mar. 11, 2021

Related U.S. Application Data

(63) Continuation of application No. 15/994,619, filed on May 31, 2018, now Pat. No. 10,843,883.

(Continued)

(51) Int. Cl.
*B65H 5/24* (2006.01)
*B65H 5/06* (2006.01)
*B27C 1/12* (2006.01)
*B27M 1/02* (2006.01)

(Continued)

(52) U.S. Cl.
CPC .............. *B65H 5/24* (2013.01); *B27C 1/00* (2013.01); *B27C 1/04* (2013.01); *B27C 1/12* (2013.01);

(Continued)

(58) Field of Classification Search
CPC .... B65H 5/06; B65H 5/24; B27C 1/00; B27C 1/04; B27C 1/12; B65G 47/88;

(Continued)

(56) References Cited

U.S. PATENT DOCUMENTS

| 4,596,326 A | * | 6/1986 | Yautz, Jr. | ........... B65G 47/8823 198/463.6 |
| 5,211,276 A | * | 5/1993 | Clopton | ............. B65G 47/8823 193/35 A |

(Continued)

FOREIGN PATENT DOCUMENTS

| BE | 753336 A | 1/1971 |
| DE | 202011004513 U1 | 7/2012 |

(Continued)

OTHER PUBLICATIONS

European Patent Application No. 18810797.3; European Search Report and Search Opinion, dated Feb. 5, 2021.

*Primary Examiner* — James R Bidwell
(74) *Attorney, Agent, or Firm* — Schwabe, Williamson & Wyatt, P.C.

(57) ABSTRACT

The present disclosure provides embodiments of a lapper assembly for use to overlap successive sheets of wood veneer or other materials along a conveyor. The lapper assembly may include a stop member configured to be rotatably mounted to a roller such that the stop member is pivotable around the rotational axis of the roller independently of the rotational angle of the roller. The lapper assembly may further include a lever arm coupled to one end of the stop member. An actuator may be pivotably coupled to the lever arm and the conveyor frame, and operated to pivot the stop member between a workpiece engaging position, in which the stop member extends into the path of workpiece flow, and a workpiece disengaging position below the path. Optionally, the lapper assembly roller and other rollers upstream/downstream may be operatively connected to a drive. Corresponding systems and methods are also disclosed herein.

20 Claims, 10 Drawing Sheets

Related U.S. Application Data

(60) Provisional application No. 62/513,442, filed on Jun. 1, 2017.

(51) Int. Cl.
  *B27C 1/04* (2006.01)
  *B27M 1/00* (2006.01)
  *B27C 1/00* (2006.01)
  *B65G 47/88* (2006.01)

(52) U.S. Cl.
  CPC .............. *B27M 1/00* (2013.01); *B27M 1/003* (2013.01); *B27M 1/02* (2013.01); *B65G 47/88* (2013.01); *B65H 5/06* (2013.01)

(58) Field of Classification Search
  CPC ............ B65G 47/8807; B65G 47/8815; B65G 47/8823; B65G 47/29; B65G 47/295; B27M 1/00; B27M 1/003; B27M 1/02
  USPC ........................................................ 198/345.3
  See application file for complete search history.

(56) References Cited

U.S. PATENT DOCUMENTS

| | | | | |
|---|---|---|---|---|
| 6,575,286 | B1 * | 6/2003 | Mills .................... | B65G 47/261 |
| | | | | 193/35 A |
| 6,763,930 | B2 * | 7/2004 | Johnson ............... | B65G 47/266 |
| | | | | 193/35 A |
| 7,249,666 | B1 * | 7/2007 | Robinson ........... | B65G 47/8823 |
| | | | | 193/35 A |
| 7,431,141 | B2 * | 10/2008 | Nadeau .................. | B08B 3/022 |
| | | | | 193/35 G |
| 10,843,883 | B2 * | 11/2020 | Spangler ........... | B65G 47/8823 |

FOREIGN PATENT DOCUMENTS

| | | |
|---|---|---|
| EP | 0164527 A1 | 12/1985 |
| EP | 2218666 A2 | 8/2010 |
| EP | 2543613 A1 | 1/2013 |
| RU | 171994 U1 | 6/2017 |
| WO | WO2006062502 A1 | 6/2006 |

\* cited by examiner

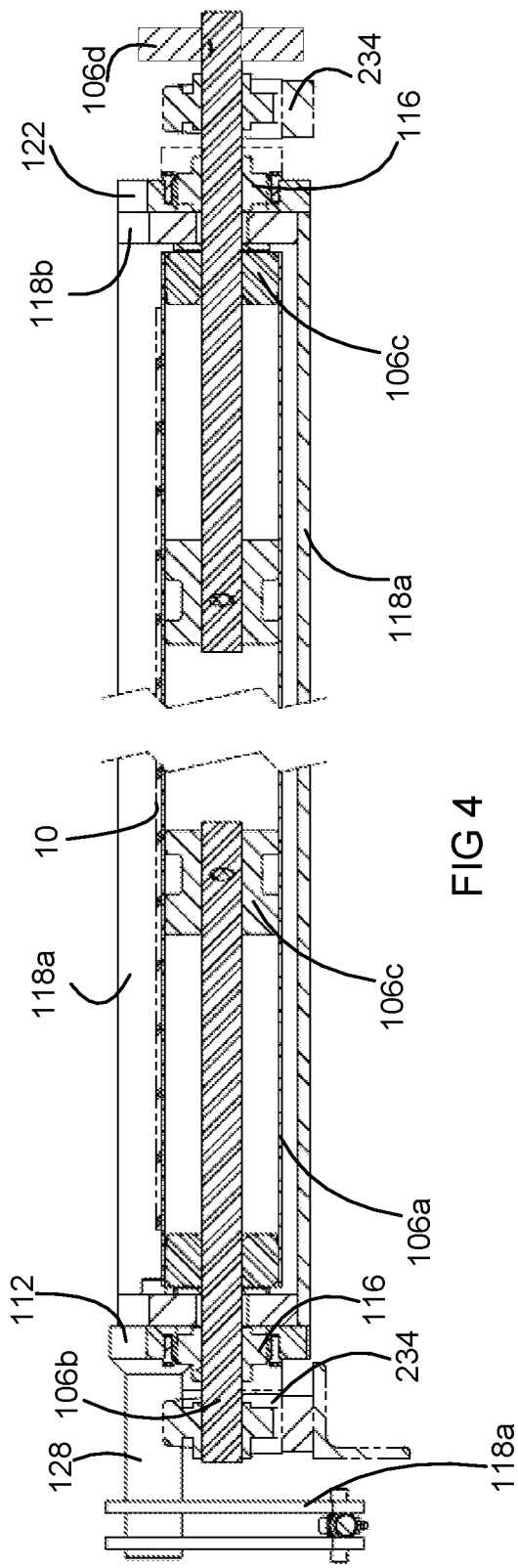
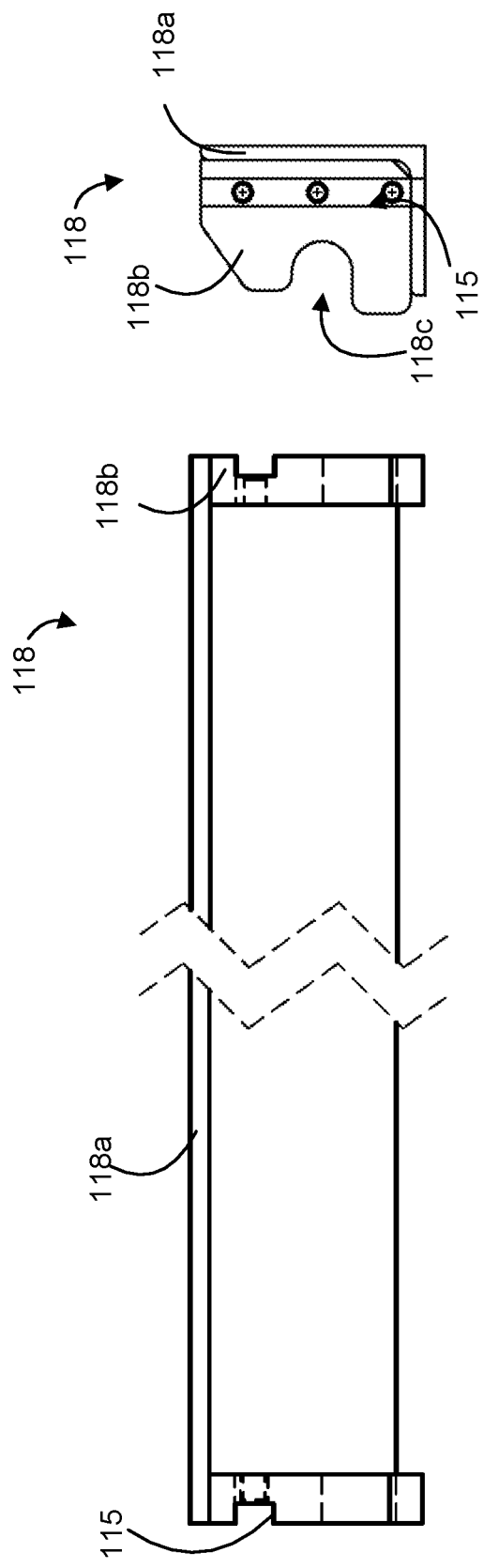

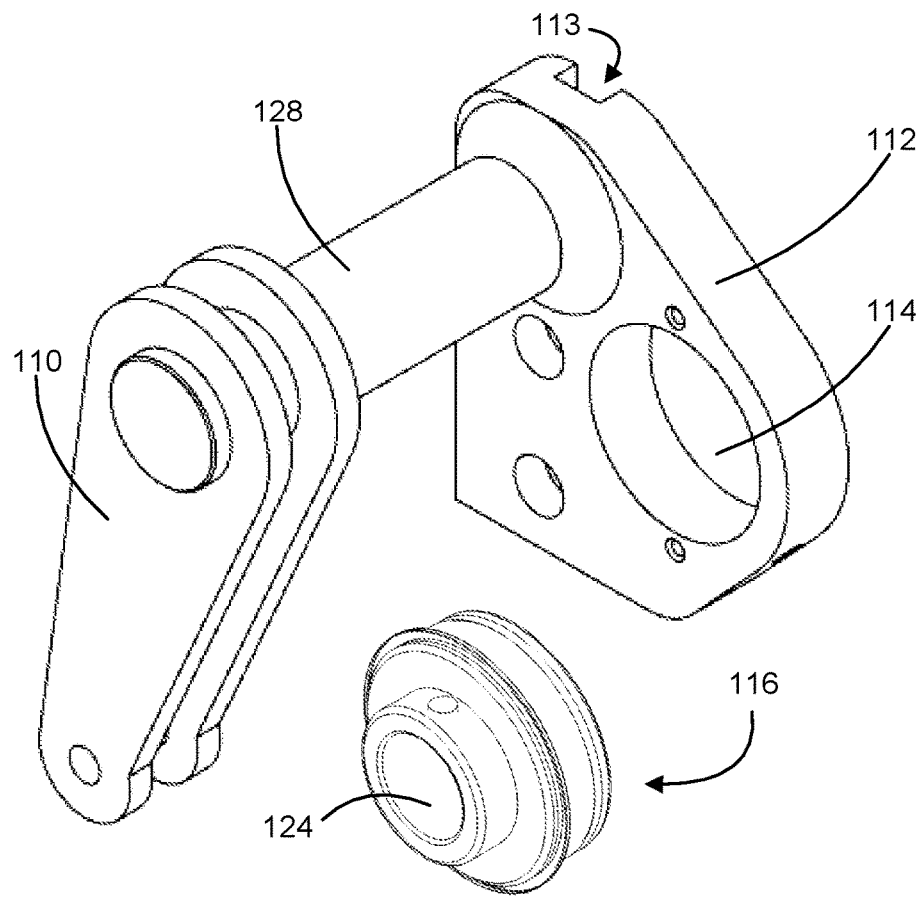
FIG 6
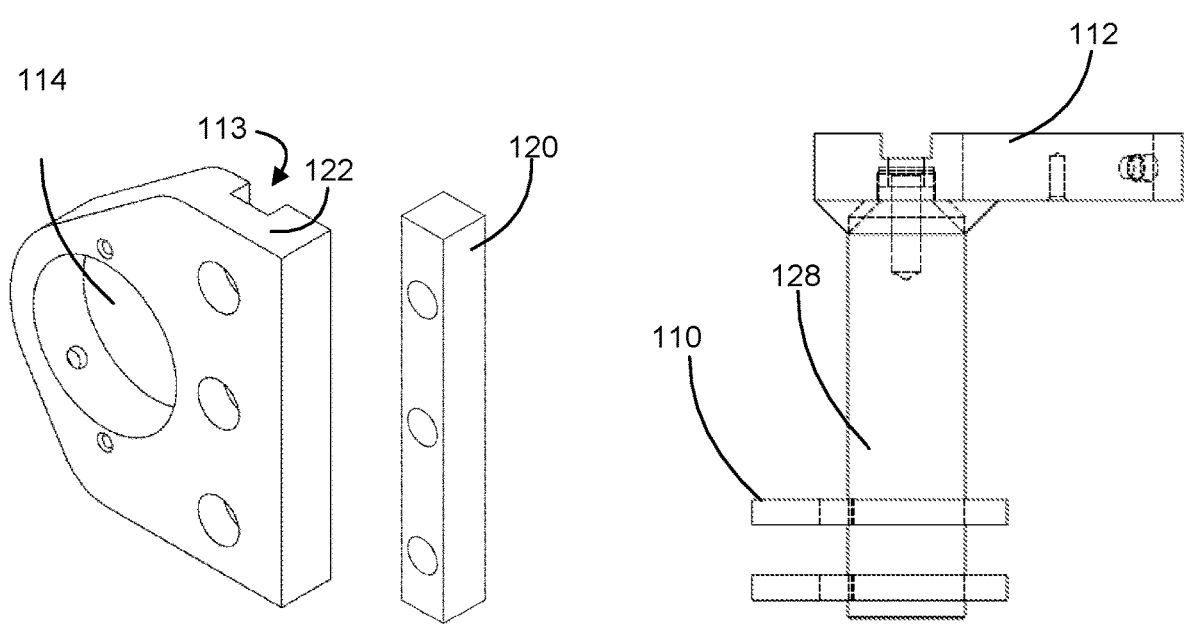
FIG 7
FIG 8

LAPPER ASSEMBLY

CROSS-REFERENCE TO RELATED APPLICATION

This application is a continuation of U.S. patent application Ser. No. 15/994,619 filed May 31, 2018, which claims the benefit of U.S. Provisional Patent Application No. 62/513,442 filed Jun. 1, 2017, both entitled LAPPER ASSEMBLY, the entire disclosures of which are hereby incorporated by reference.

TECHNICAL FIELD

Embodiments herein relate to the field of materials handling, and, more specifically, to methods, apparatuses, and systems for overlapping sheets of wood veneer or other materials on a conveyor.

BACKGROUND

Wood veneer and other sheet materials are typically dried by conveying the sheets through a drying apparatus. The sheets may be moved through the dryer between driven conveyor rollers that help to keep the sheets relatively flat as they progress toward the output end of the dryer. In some operations, successive sheets are overlapped at their leading and lagging ends before they enter the input end of the dryer in order to increase throughput through the dryer. Conventional lappers have been used for this purpose. The conventional lapper is a roller with a flat elongated bar rigidly attached along the length of the roller. One end of the roller is connected to an actuator. The actuator is used to pivot the lapper roller in opposite directions to move the bar into and out of the flow path of the sheets. Because the bar is fixed in position relative to the roller, the rotational angle of the roller determines the position of the bar.

When the leading end of a sheet contacts the bar, the lapper roller is pivoted in one direction to move the bar out of the feed path, which allows the sheet to proceed in the flow direction. When the trailing end of the sheet approaches the lapper roller, the actuator is used to pivot the lapper roller in the opposite direction, thereby moving the bar into the flow path and lifting the trailing end of the sheet above the flow path on the outer edge of the bar. When the leading edge of the next successive sheet contacts the bar, the lapper is pivoted in the first direction again to lower the bar below the flow path and deposit the trailing edge of the first sheet onto the leading edge of the next successive sheet.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4 illustrates a sectional view of a lapper assembly, taken along the lines A-A of FIG. 3B;

FIGS. 5A and 5B illustrate plan and side elevational views, respectively, of a stop member;

FIG. 6 illustrates a perspective view of components of the lapper assembly;

FIG. 7 illustrates a perspective view of additional components of the lapper assembly;

FIG. 8 illustrates a plan view of components shown in FIG. 6;

DETAILED DESCRIPTION OF DISCLOSED EMBODIMENTS

Figure 1:
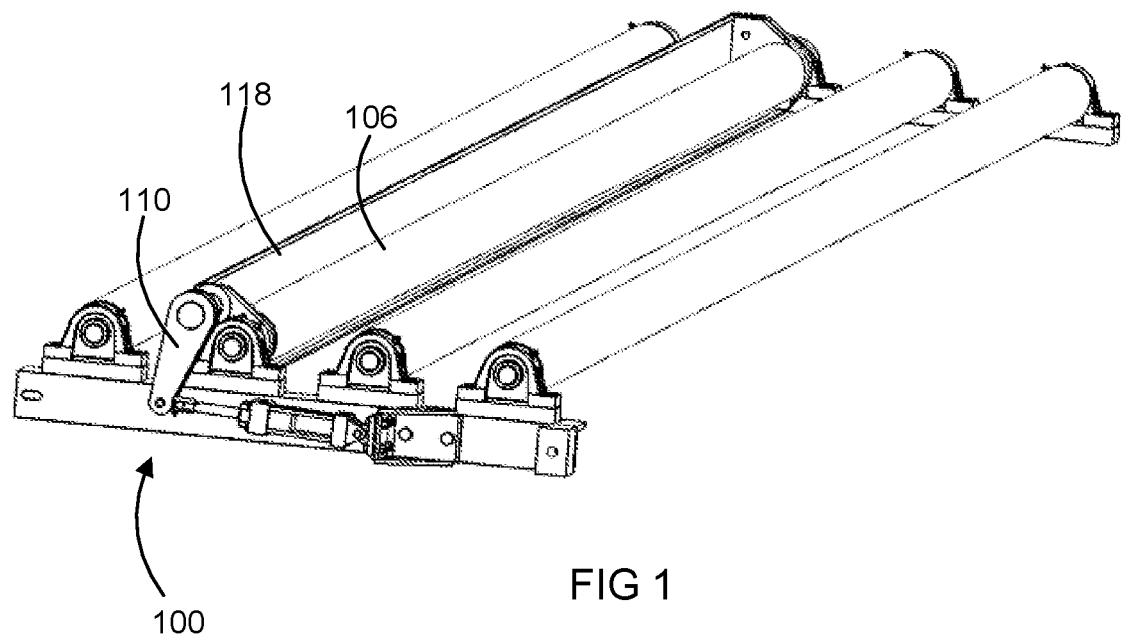
FIG. 1 illustrates a perspective view of a lapper assembly.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB), that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

As used herein, the term "workpiece" refers to a sheet of material. Examples of workpieces include, but are not limited to, sheets of veneer, sheets of engineered wood/composite wood material, gypsum board, and other such sheet materials.

The present disclosure provides embodiments of methods, apparatuses, and systems for overlapping workpieces on a conveyor. In exemplary embodiments, a computing device may be endowed with one or more components of the disclosed apparatuses and/or systems and may be employed to perform one or more methods as disclosed herein.

In a conventional lapper, the position of the bar is a function of the rotational angle of the roller; the roller cannot be rotated while the stop member remains stationary (and vice versa). As sheets of veneer contact the roller, the sheets may skid across its surface, which may damage the veneer sheets or cause them to shift from their positions along the feed path. Misaligned sheets may cause the dryer to jam, resulting in lost production time, damage to the sheets, and/or fires in the dryer.

In addition, conventional lappers must be spaced apart from one another along the conveyor by at least a minimum distance because of the drag induced by the stationary roller. This limits the number of conventional lappers that can be used along a given conveyor, which in turn may limit the operator's ability to use the conveyor to overlap workpieces of different or variable lengths.

The present disclosure provides embodiments of a lapper assembly that may help to reduce or overcome one or more of these disadvantages.

In various embodiments, a lapper assembly may include a stop member configured to be pivotably coupled to a lapping roller, such that the stop member is pivotable about the rotational axis of the roller. The stop member may include an elongated plate. In some embodiments the plate may be angled or curved in cross-section. Alternatively, the plate may be substantially planar. In some embodiments, the stop member may further include a pair of end members, such as plates, brackets, or the like, coupled to the opposite ends of the plate. If present, the end members may have an outer rim with a recess that is shaped to extend partially around a portion of the lapping roller (e.g., an end of the lapping roller).

Optionally, the lapper assembly may further include the lapping roller, which may be configured/dimensioned to accommodate the stop member. For example, the lapping roller may have a middle portion and end portions that are smaller in diameter than the middle portion. The length of the middle portion may be less than the length of the stop member. In other embodiments the lapper assembly may not include a lapping roller. For example, in some such embodiments the lapper assembly may be configured to be pivotably mounted to a conventional roller, or the lapper assembly may be provided as a kit and the lapping roller may be provided separately.

The stop member may be configured to be coupled to an actuator that is operable to move the stop member between a workpiece engaging position and a workpiece disengaging position. The lapping roller may be configured to be coupled to another actuator or drive that is operable to drive the lapping roller in rotation. In some embodiments, the lapping roller and at least some of the conveyor rollers upstream/downstream of the lapping roller may be operatively coupled with a drive chain that drives them in rotation. Alternatively, the lapping roller may be driven by a separate actuator, or may be a passive roller that is not driven but is freely rotatable. Regardless, the stop member may be movable independently of the lapping roller, and vice versa.

In some embodiments, the stop member may be configured to be removably coupled to the lapping roller. For example, the lapper assembly may include a pair of supports, such as bearing mounts, that are configured to be rotatably mounted to the roller and removably coupled to the corresponding opposite ends of the stop member. Collectively, the stop member and the supports may form a stop member assembly. Such configurations may allow the stop member or some portion thereof to be coupled to, and uncoupled from, the lapping roller (e.g., by coupling the supports to, or detaching them from, the stop member) without removing the lapping roller from the conveyor. The supports and/or other components of the lapper assembly may also be configured to be removably coupled to the lapping roller and/or the stop member. This may enable the operator to replace or repair one or more components of the lapper assembly without removing the entire assembly from the conveyor. Optionally, the lapper assembly may be provided as a kit, such as a replacement kit or upgrade kit for an existing conveyor.

The lapper assembly may be used to overlap the adjacent ends of consecutive workpieces moving on a conveyor in a direction of flow. In various embodiments, a method of overlapping consecutive workpieces may include moving the stop member between a workpiece engaging position and a workpiece disengaging position, and rotating the lapping roller while maintaining the stop member in one of said positions. The stop member may be moved in a first direction to the workpiece engaging position to thereby lift the trailing end of a first workpiece above the flow path on the stop member. The stop member may be maintained in the workpiece engaging position until the leading end of a next successive second workpiece is proximal to, or in contact with, the stop member. The stop member may then be moved in the opposite direction to the workpiece disengaging position to thereby lower the trailing end of the first workpiece onto the leading edge of the second workpiece. The stop member may be maintained in the workpiece disengaging position while a portion of the second workpiece passes over the lapping roller. The stop member may be rotated in the first direction to the workpiece engaging position to thereby lift the trailing end of the second workpiece above the flow path on the stop member.

In various embodiments, a conveyor system may include a frame, a plurality of conveyor rollers rotatably coupled to the frame, and at least one lapper assembly coupled to the frame. The conveyor rollers may be spaced apart at regular intervals. The lapper assembly may be disposed between two of the conveyor rollers. In some embodiments, the distance between the lapper assembly and the next consecutive conveyor roller may be the same as the distance between two of the conveyor rollers. Optionally, a conveyor system may have lapper assemblies and/or lapping rollers in place of two or more of the conveyor rollers. This may allow an operator to move the stop member and other components of the lapper assembly from one of the lapping rollers to another, to thereby change the location of the lapper assembly. Alternatively, a conveyor system may include multiple lapper assemblies. Some conveyor systems may include one or more lapper assemblies and one or more conventional lappers. In some embodiments, the conveyor system may have multiple decks, each with a corresponding plurality of conveyor rollers, and at least one of the decks may include a lapper assembly.

In various embodiments, a conveyor may be modified or upgraded by installing a lapper assembly along the path of flow of the conveyor. The conveyor may include a plurality of conveyor rollers, and the method may include removing one of the conveyor rollers and installing the lapper assembly in place of the conveyor roller. In a particular embodiment, the conveyor may be the infeed conveyor of a sheet material dryer (e.g., a jet veneer dryer).

Figure 2:
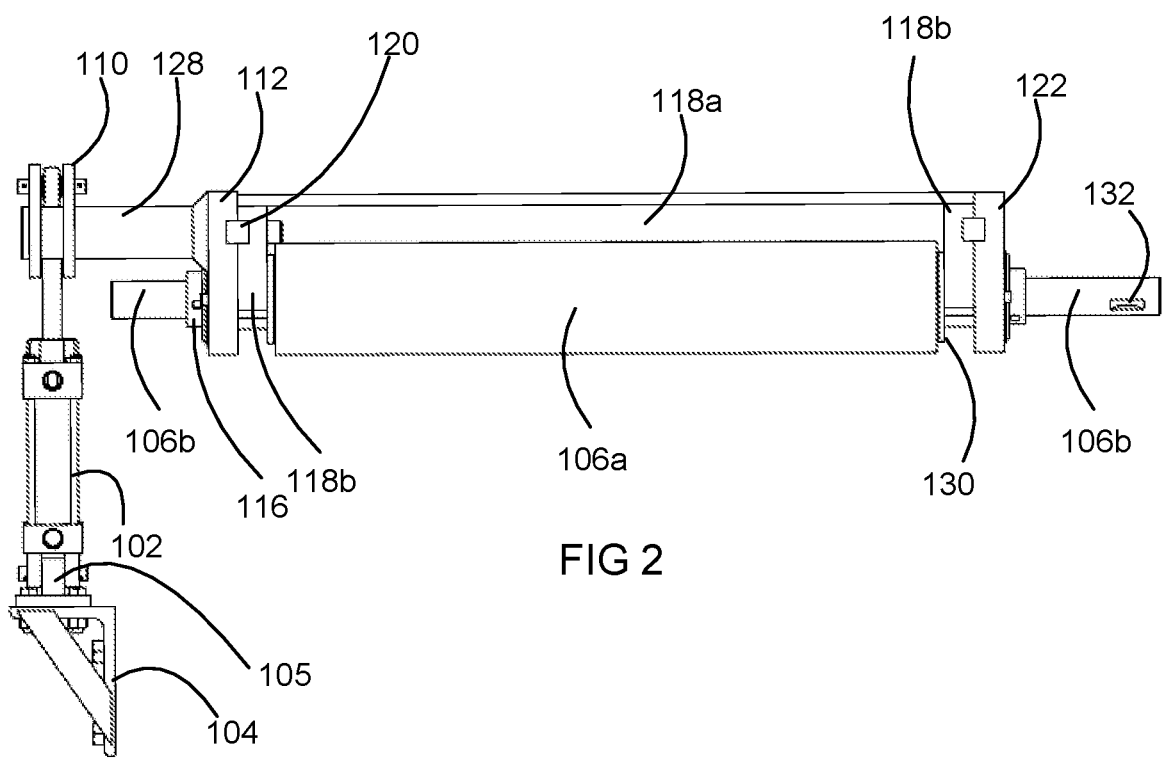
FIG. 2 illustrates a plan view of the lapper assembly of FIG. 1.

FIGS. 1 and 2 illustrate perspective and plan views, respectively, of a lapper assembly 100, in accordance with various embodiments. The lapper assembly 100 may include a lever arm 110, an offset shaft 128, first and second bearing mounts 112 and 122, and a stop member 118. In some embodiments, lapper assembly 100 may further include a roller 106. Optionally, lapper assembly 100 may include an actuator 102.

The stop member 118 may be an elongated article that is flat, curved, or angular in cross-section, and formed of a rigid material, such as steel, iron, hard plastic, or some combination thereof. Optionally, the stop member 118 may be L-shaped or curved in cross-section to further promote the rigidity of the stop member 118.

In some embodiments, stop member 118 may include an elongated plate member 118a that is either curved or angular in cross-section, and two end members 118b coupled to the opposite ends, respectively, of plate member 118a (FIGS. 5A, 5B). End members 118b may be generally planar and oriented substantially perpendicular to the longitudinal axis of plate member 118a. In some embodiments end members 118b may be coupled to plate member 118a by welding. In other embodiments, end members 118b may be coupled to plate member 118a by bolts or other fasteners. Alternatively, stop member 118 may be formed from a single sheet of steel or other suitable material (e.g., by bending portions of the sheet), and end members 118b and plate member 118a may be the corresponding portions of the sheet. Regardless, each end member 118b may have a recess 118c, which may be an open-ended slot of greater diameter than a corresponding portion of roller 106. In still other embodiments, one or both of the end members may be omitted.

As best shown in FIGS. 6-8, the first and second bearing mounts 112 and 122 may be substantially planar, each with a pair of opposed faces and an outer rim. In some embodiments the bearing mounts may be plates cut or machined from sheet steel (e.g., mild steel) or other relatively rigid, durable material. Alternatively, the bearing mounts may be cast, or formed by any other suitable method or process.

In side elevational view (i.e., viewed along a line of sight that is normal to the faces of the bearing mounts), the bearing mounts may be generally polygonal in shape (e.g., triangular, rectangular, or pentagonal). Optionally, one or more of the corners may be curved or rounded. Other bearing mount shapes are also possible. For example, one or both of the bearing mounts could be oval/ovoid, circular, polygonal without rounded corners, or any other suitable shape. In some embodiments both of the bearing mounts may have similar or identical shapes and dimensions. Alternatively, the shape and/or dimensions of the first and second bearing mounts may be different. For example, in some embodiments the first bearing mount 112 may have a slightly greater height, width, and/or thickness than the second bearing mount 122, or vice versa.

Regardless, each bearing mount may have an aperture 114 that extends through its opposed faces. In some embodiments the aperture may be vertically and/or laterally offset relative to the center of the bearing mount faces, such that the center of the aperture does not coincide with the center of the bearing mount/faces. For example, if a bearing mount is generally polygonal, the aperture may be proximal to one of the corners. Optionally, as shown for example in FIGS. 6 and 7, each of the bearing mounts may be generally polygonal (e.g., pentagonal) and each aperture 114 may be proximal to the corner that is opposite to the longest side of the polygon.

A bearing 116 with a center aperture 124 may be fitted to each of the bearing mounts. The bearing 116 may extend at least partially through the corresponding aperture 114. Bearing 116 may be a ball bearing. Alternatively, bearing 116 may be any other suitable type of bearing. Optionally, the bearing may have a rim or lip of larger diameter than the aperture 114, and may be coupled to the corresponding bearing mount by fasteners (e.g., bolts, screws, pins, etc.) inserted through the rim or lip and into the bearing mount. The apertures 124 may be dimensioned to receive a portion of a corresponding roller 106.

The first bearing mount 112 and second bearing mount 122 may be configured to be coupled to the opposite ends of stop member 118 via respective fasteners, such as bolts, screws, welds, epoxy, or some combination thereof. The stop member 118 may be coupled to the bearing mounts with removable fasteners, such as bolts or screws, to enable removal of the stop member from the rest of the assembly (e.g., for repair or replacement of the stop member). Alternatively, the stop member may be welded or otherwise permanently affixed to one or both of the bearing mounts.

In some embodiments a notch 113 may be provided along the inner faces of each of the bearing mounts 112 and 122, laterally offset from the aperture 114 (FIGS. 6-8). Corresponding notches 115 may be provided along the outer faces of the end members 118b and the edge of plate member 118a (FIGS. 5A-5B) to align with the notches along the bearing mounts, such that the notches at each side collectively form a keyway (e.g., a rectangular cavity). A corresponding key member 120 (e.g., a rectangular block) may be fitted within each of the keyways (FIGS. 2 and 7). Through-holes may be provided through the key members, and through the bearing mounts and end members within their respective notches. Removable fasteners (e.g., bolts, screws, or the like) may be inserted through the through-holes to couple the stop member 118 to the bearing mounts 112 and 122. This configuration may reduce stress/strain on the fasteners that couple the stop member to the bearing mounts by distributing the force of impacts against the plate member 118a along a larger surface area (e.g., the surfaces of notches/key members and bearing mounts). Other embodiments may lack one or both of the key members and the corresponding notches. For example, one or both of the bearing mounts may be coupled to the stop member by bolts, welds, or other suitable means.

As best shown in FIGS. 1 and 4, one end of offset shaft 128 may be coupled to the outer face of bearing mount 112. Offset shaft 128 may be positioned substantially normal to the outer face, and laterally/vertically offset from aperture 114. In some embodiments the end of offset shaft 128 may be fitted within a recess that surrounds a through-hole through the faces (e.g., one of the through-holes for coupling the stop member 118 to the bearing mount 112), and offset shaft 128 may be coupled to the bearing mount 112 by a fastener disposed through the bearing mount 112 and the end of shaft 128.

A second end of the offset shaft 128 may be coupled to one end of lever arm 110 (FIG. 6). In some embodiments, lever arm 110 may be a pair of lever arms spaced apart along the second end of offset shaft 128. Alternatively, lever arm 110 may be a single lever arm. The lever arm 110, shaft 128, and bearing mount 112 may be rigidly coupled together, with the lever arm and shaft fixed in position relative to the bearing mount. The other end of lever arm 110 may be configured to be coupled to one end of an actuator 102. For example, the free end of lever arm 110 may have one or more through-holes dimensioned to accommodate a pivot pin inserted through a corresponding through-hole in the end of the actuator.

Figure 9:
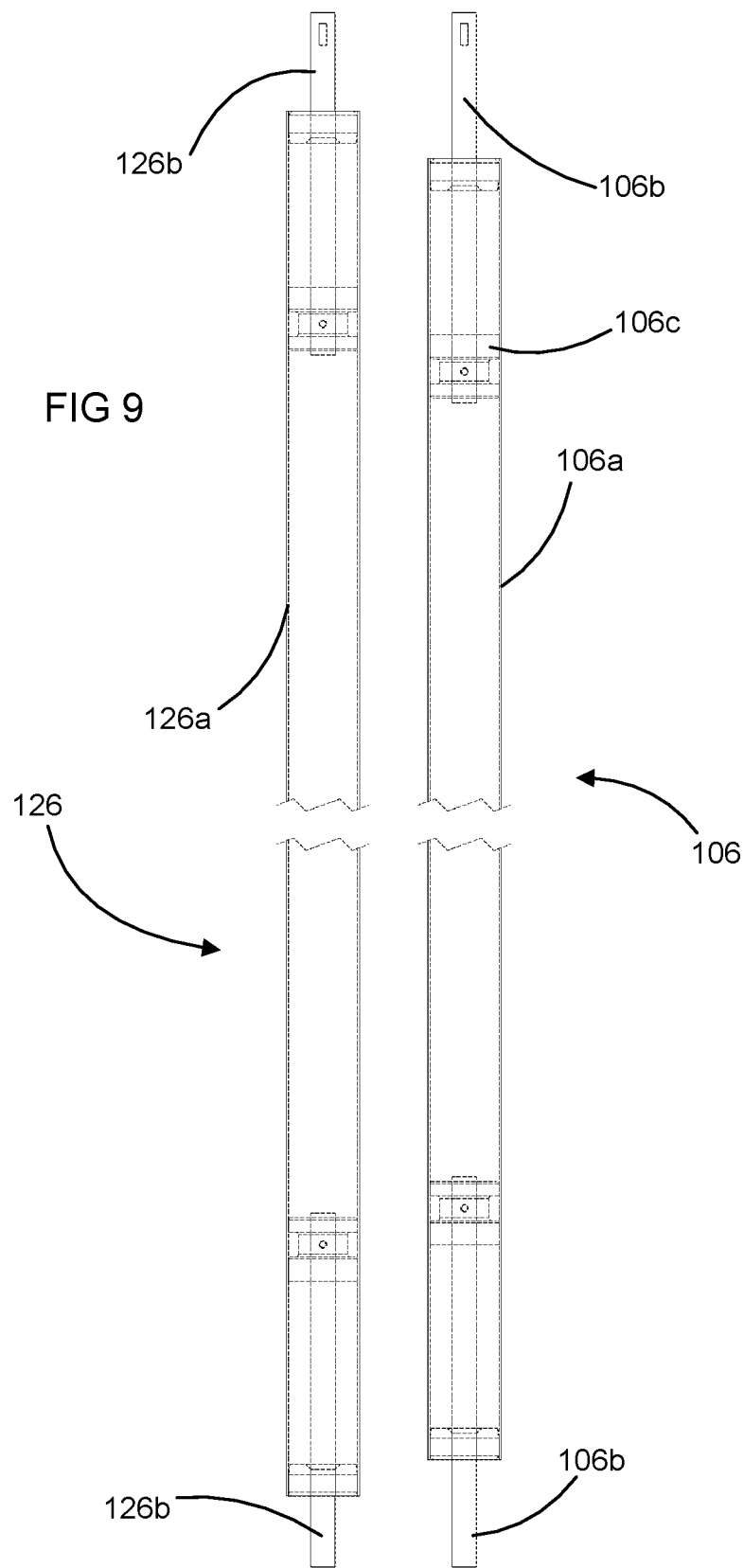
FIG. 9 is a schematic view of a conveyor roller and a lapping roller.

Referring now to FIG. 9, roller 106 may have a middle portion 106a and opposite end portions 106b. The diameter of the end portions 106b may be less than the diameter of the middle portion 106a. In some embodiments, middle portion 106a may be a hollow tube, and each end portion 106b may be a shaft or portion thereof that extends outwardly from the ends of the hollow tube. Each shaft may be retained in place by a corresponding housing 106c (e.g., a bell housing and/or an end cap) that is dimensioned to be fitted into and/or around the corresponding end of the hollow tube (e.g., by press-fitting). Optionally, some or all of the housing may be retained within the tube. In some embodiments, each shaft and its corresponding housing(s) may be portions of a gudgeon. Other roller configurations are also possible. For example, in other embodiments roller 106 may be a solid roller, or a conventional roller of any suitable type or configuration.

In some embodiments, at least one end portion 106b (e.g., the drive-side end) may be configured to be coupled to a sprocket 106d (FIG. 4). For example, a drive-side end portion 106b may have a notch or keyway 132 (FIG. 2) or other such feature known for use to attach a sprocket to the end of a conveyor roller. Alternatively, the end portion 106b may be configured to be coupled to a gear, a pulley, or any other article suitable for use to couple the roller 106 to the chain or belt of a drive system. In other embodiments, the end portion 106b may be configured to be directly coupled to an independent actuator or drive, such as a servo motor. In still other embodiments, the end portion 106b may lack such features, and the roller 106 may be permitted to rotate freely (e.g., by a sheet moving over the roller) without being driven by an actuator or drive system.

In various embodiments, roller 106 may have substantially the same length as a standard conveyor roller 126. However, one or both of the end portions 106b may be longer than the end portions of the standard conveyor roller, and middle portion 106a may be shorter than the middle portion of the standard conveyor roller 126. For example, if the standard conveyor roller 126 is 186.5 inches long in total, the middle portion 126a is 180 inches long, the drive-side end portion 126b is 4.25 inches long, and the actuator-side end portion 126b is 2.25 inches long, the roller 106 may be 186.5 inches long, middle portion 106a may be 173.5 inches long, the drive-side end portion 106b may be 7.5 inches long, and the actuator-side end portion 126b may be 5.5 inches long. As another example, roller 106 may have the same length as a standard conveyor roller, but the middle portion may be 2-12 inches shorter and each end portion 1-6 inches longer than the corresponding portions of the standard conveyor roller.

In various embodiments, the lapper assembly may be assembled generally as follows. The bearings 116 may be coupled to the respective bearing mounts 112, 122, and the bearing mounts may be mounted on respective end portions 106b of the roller 106 by sliding each bearing mount onto each end portion 106b such that the end portion extends through the aperture 124 of the corresponding bearing 116. Bearing mount 112 may be mounted to the actuator-side end portion 106b, and bearing mount 122 may be mounted to the drive-side end portion 106b. Optionally, before placing the bearing mount(s) over the respective end portion(s), one or more spacers 130 (e.g., a washer, a ring, an annular plate, etc.) may be placed over the end portion(s) to maintain a desired distance or offset between stop member 118 and the middle portion 106a of roller 106, and/or to accommodate rollers of different sizes (see FIG. 2). The offset shaft 128 and lever arm(s) 110 may be connected to the outer face of the bearing mount 112. Key members 120 and stop member 118 may be placed between the inner faces of the bearing mounts and connected to them (e.g., with bolts or other fasteners) as described above.

The above operations may be performed in any suitable order. For example, instead of placing the bearing mounts onto the end portions of the roller and subsequently coupling the stop member to the bearing mounts, one of the bearing mounts may instead be coupled to the corresponding end of the stop member before placing both bearing mounts onto the roller, and the other end of the stop member may then be coupled to the other bearing mount. As another example, the bearings may be coupled to the bearing mounts before moving the bearing mounts into position on the end members of the roller, or the bearings may be mounted onto on the end members before moving the bearing mounts into position on the end members and coupling the bearings to the bearing mounts. Similarly, the lever arm(s) and offset shaft may be coupled to the corresponding bearing mount either before or after mounting the first bearing mount to the roller. As still another example, all of the components of the lapper assembly may be coupled together and mounted on the roller before mounting the roller to a support (e.g., a conveyor frame), or some of the components (e.g., bearing mounts) may be coupled with the roller before mounting the roller to the support and attaching other components (e.g., stop member, offset shaft, and/or lever arm).

In some embodiments, the lapper assembly 100 may be produced or provided in a pre-assembled configuration, with the roller 106 coupled to the bearing mounts, stop member, and other components of the lapper assembly. For example, this may be the case in embodiments in which the stop member 118 is coupled to the bearing mounts by welds or other permanent/non-removable fasteners, and the ends 106b of the roller 106 are integral to the roller or permanently/non-removably affixed to the middle portion 106a of the roller (e.g., as part of gudgeons that are press-fitted or welded to the middle portion). Such a lapper assembly may be installed as a single unit. For example, the lapper assembly may be installed by removing one of the conventional conveyor rollers 126 from its position along the conveyor/deck and replacing it with the lapper assembly 100.

Some embodiments may omit roller 106. For example, an alternative lapper assembly may include a stop member configured to be rotatably mounted to the middle portion 126a of a standard/conventional conveyor roller 126. In such embodiments, the diameters of the bearing apertures 124 (and optionally, apertures 114, bearings 116, and/or the bearing mounts) may be increased accordingly (e.g., to a diameter slightly greater than the diameter of the middle portion 126a) to accommodate the middle portion of the roller. In addition, end members 118b may be omitted or recess 118c may be larger to accommodate the diameter of the middle portion 126a. As another example, some embodiments of lapper assembly 100 may be provided as an assembly or kit without roller 106, and roller 106 or a substitute therefor may be provided separately.

In various embodiments, lapper assembly 100 as assembled may have stop member 118 rotatably mounted to the roller 106 with the middle portion 106a of roller 106 disposed between the end members 118b (or between bearing mounts 112 and 122 in embodiments without end members 118b), and with roller 106 generally parallel to the longitudinal axis of the plate member 118a (see e.g., FIG. 4). If L-shaped or curved in cross-section, the stop member 118 may extend partially around the middle portion of the roller 106, with one longitudinal edge of the stop member 118 located on one side of the roller 106 and the other longitudinal edge of the stop member 118 located on another side of the roller 106. In embodiments with end members 118b, the end portions 106b of the roller 106 may extend through the respective recesses 118c.

In some embodiments, lapper assembly 100 may further include actuator 102. The actuator 102 may be (or may include) a mechanical actuator (e.g., a cam or eccentric wheel, a ball/roller screw, etc.), an electrical/electro-mechanical actuator (e.g., a ball screw or roller screw driven by an electric motor), a hydraulic cylinder, a pneumatic cylinder, another type of linear positioner, or any other suitable type of actuator. In some embodiments, actuator 102 includes a piston, and the actuator is selectively operable to extend and retract the piston to thereby apply force in opposite directions.

Figure 3A:
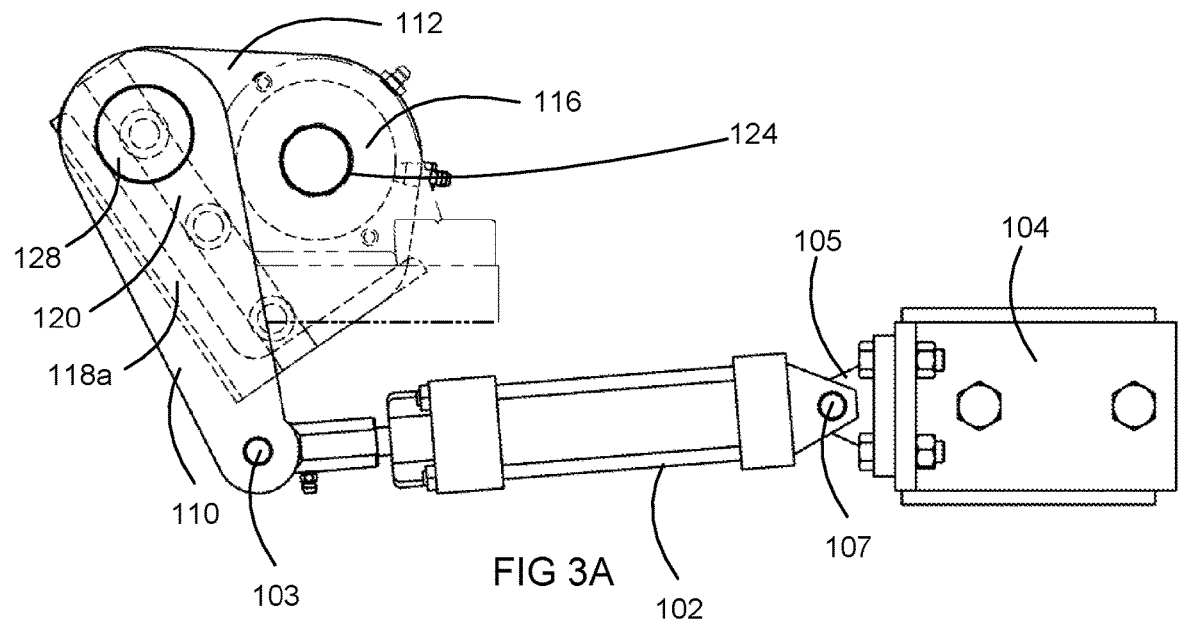
FIGS. 3A and 3B illustrate side elevational views of a lapper assembly with the stop member in the workpiece disengaging position (FIG. 3A) and with the stop member in the workpiece engaging position (FIG. 3B)
Figure 3B:
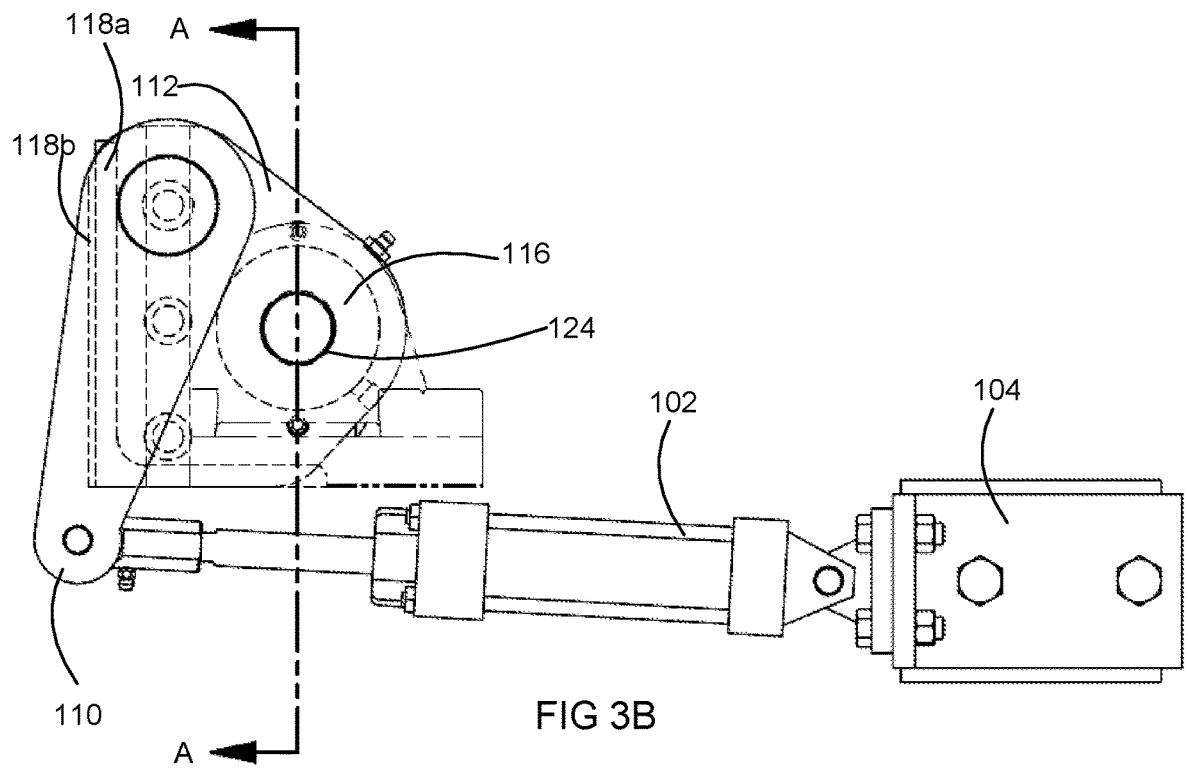

Referring now to FIGS. 3A and 3B, one end of the actuator 102 (e.g., the piston end) may be pivotably coupled to the lever arm 110 by conventional means. For example, if lever arm 110 is a pair of lever arms, the end of the actuator may be positioned between the lever arms and a pivot/clevis pin 103 may be inserted through holes in the end of the actuator and lever arms. Alternatively, if actuator 102 includes a cam or eccentric wheel, the lever arm(s) may rest on a surface of the cam or eccentric wheel, either directly or via a pin or other component.

The other end of the actuator 102 may be coupled to a support, such as the frame of a conveyor. For example, in some embodiments the actuator may be coupled to one side of the support by an attachment mechanism 104, which may be (or may include) a bracket, a plate, and/or a bolt(s), or combination thereof. The attachment mechanism 104 may be configured to be attached to the support by one or more secondary fasteners (e.g., bolts, screws, or rivets), welds, epoxy, or some combination thereof.

In some embodiments, the actuator 102 may be pivotably coupled to the attachment mechanism 104 via an interface fixture 105 that is attached to the attachment mechanism 104 by one or more fasteners (e.g., bolts, screws, or rivets). In some embodiments, the interface fixture 105 may be welded to the attachment mechanism 104 or formed of the same piece of material as the attachment mechanism 104. For example, in some embodiments the attachment mechanism may be an L-shaped bracket, and the interface fixture may be an eye bracket (or a pair of eye brackets) that is welded or bolted or otherwise affixed to the attachment mechanism. The actuator 102 may be pivotably coupled to the interface fixture 105 via a fastener 107, such as a pivot pin. For example, the fastener 107 may be a pin inserted through corresponding holes in the actuator and interface fixture.

In some embodiments, a shock absorbing pad or material (not shown) may be located between the interface fixture 105 and the attachment mechanism 104. The shock absorbing pad or material may be configured to absorb and/or dampen any shock that may occur between the interface fixture 105 and the attachment mechanism 104. The shock absorbing pad or material may include or may be an elastomeric or compressible material, such as rubber, plastic, elastomeric polymers, cotton duck, fiber, other elastomeric materials, or some combination thereof.

Other embodiments may omit fastener 104, interface fixture 105, and/or fastener 107. For example, in some embodiments the first end of actuator 102 may be coupled to the frame by a pivot/clevis pin disposed through corresponding holes of the actuator and frame, by a bearing, or by any other suitable means known in the art.

In operation, extending or retracting the piston of the actuator 102 exerts force against the lever arm 110. Lever arm 110 transmits the force to the offset shaft 128, which in turn transmits the force to the first bearing mount 112 (see FIGS. 3A, 3B). Because the bearing mounts 112, 122 are rotatably mounted on roller 106 and fixedly connected to one another by stop member 118, and the offset shaft 128 is fixedly connected to the first bearing mount and offset from the rotational axis of the roller 106, the transmitted force pivots the bearing mounts around the corresponding portions of the roller 106, thereby moving stop member 118 along an arcuate path around the rotational axis of the roller. Mounting the stop member to the roller on bearings that are rotatable around (and relative to) the roller 106 allows the roller to be rotated relative to the bearing mounts, and vice versa, as desired. Thus, the roller can be rotated while the stop member remains stationary, the stop member can be pivoted around the roller while the roller remains stationary, and the roller and stop member can be rotated at the same speed or at different speeds and in the same direction or in different directions. FIGS. 3A and 3B show lapper assembly 100 with the stop member in the workpiece disengaging position (FIG. 3A) and in the workpiece engaging position (FIG. 3B).

In various embodiments, a feed system may include a conveyor and a lapper assembly (e.g., lapper assembly 100) operatively coupled to the conveyor. Some embodiments may include a single conveyor and one or more lapper assemblies. Other embodiments may include multiple conveyors and one or more lapper assemblies operatively coupled with a corresponding one or more (or all) of the conveyors. The type and configuration of the conveyor(s) may vary among embodiments. For example, the conveyor(s) may be, or may include, a conventional roller conveyor or any other conveyor that includes at least one driven conveyor roller.

Figure 10:
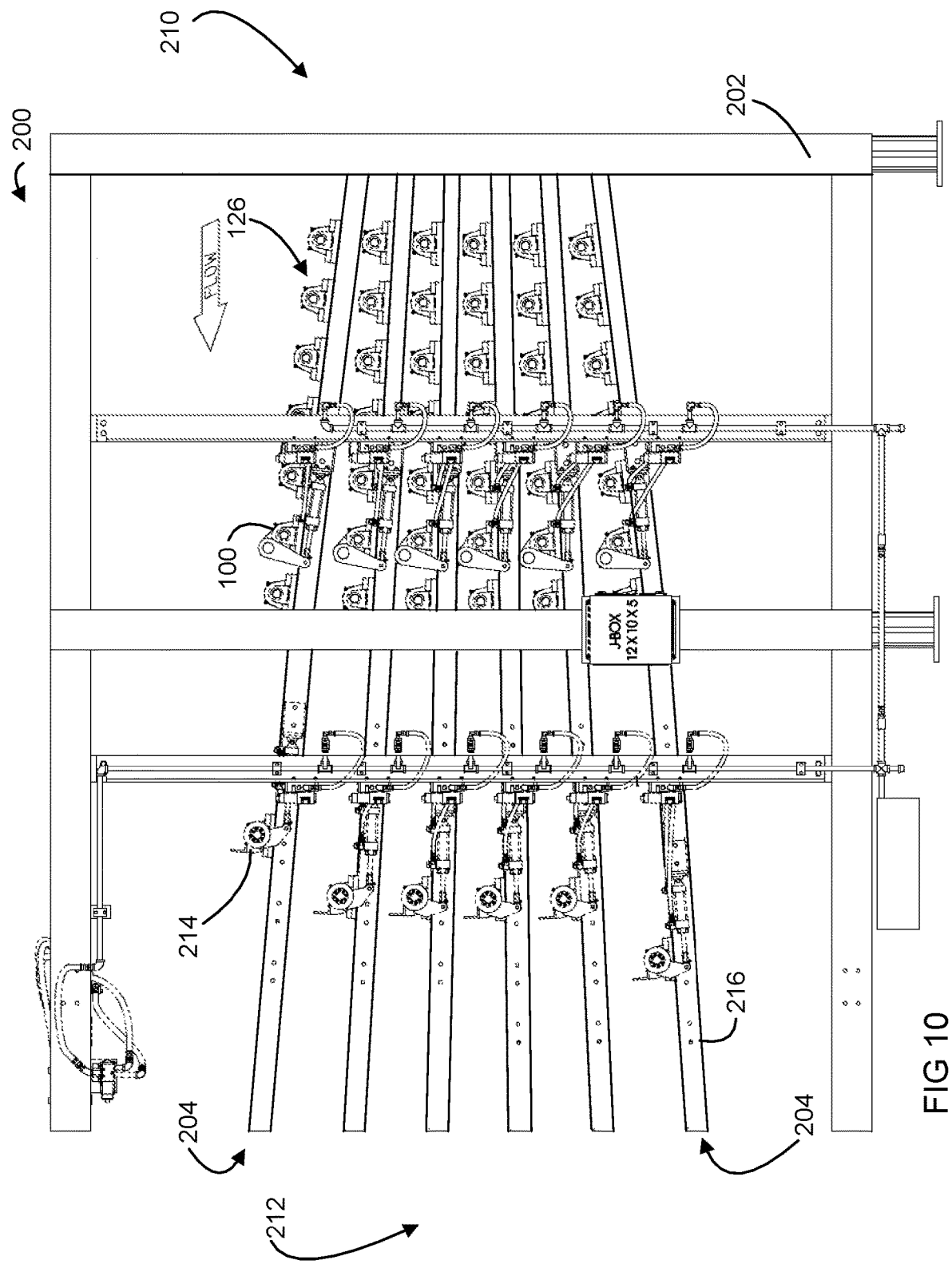
FIG. 10 illustrates a partial side elevational view of the actuator side of an infeed conveyor, with some components removed for clarity.
Figure 12:
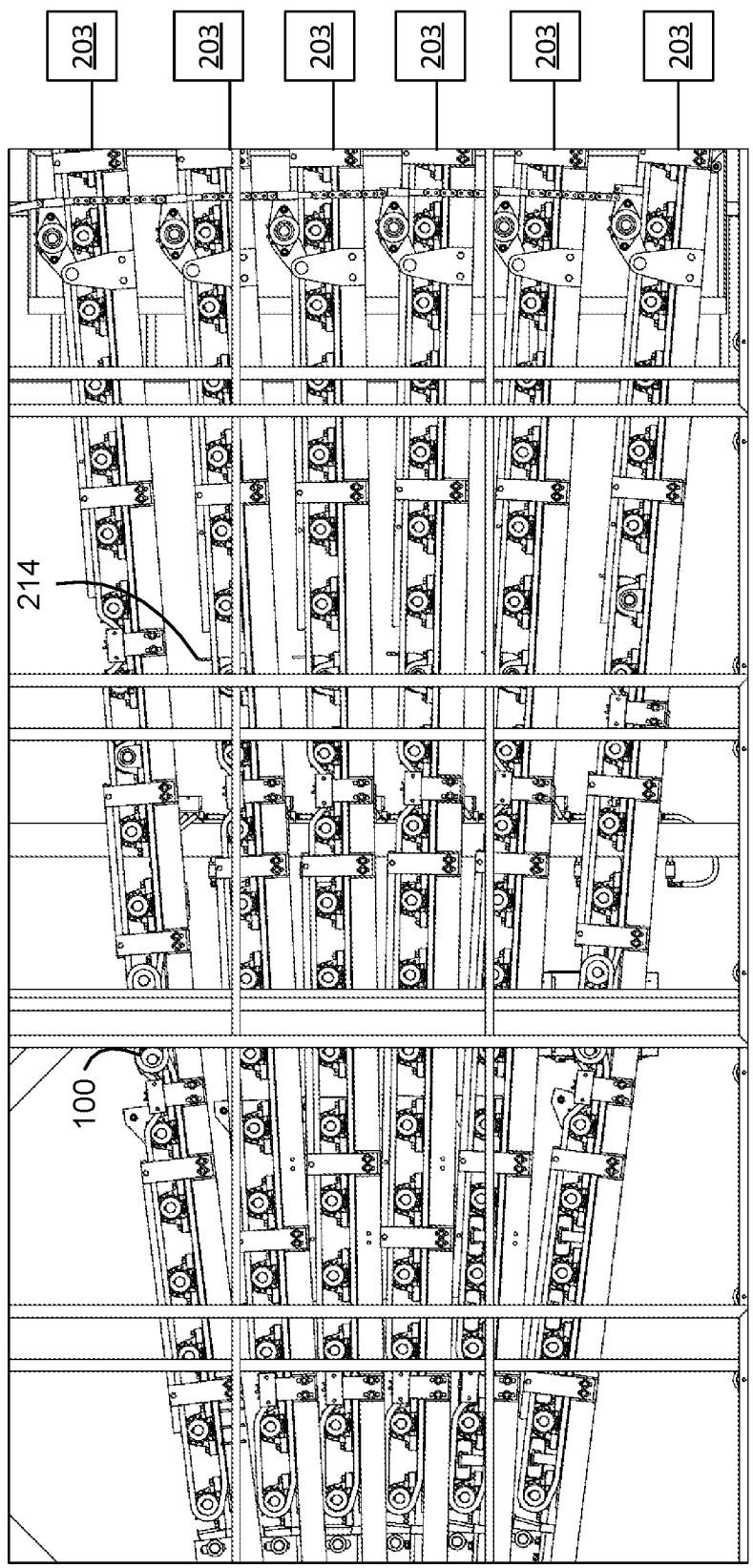
FIG. 12 illustrates a partial side elevational view of the drive side of an infeed conveyor.
Figure 13:
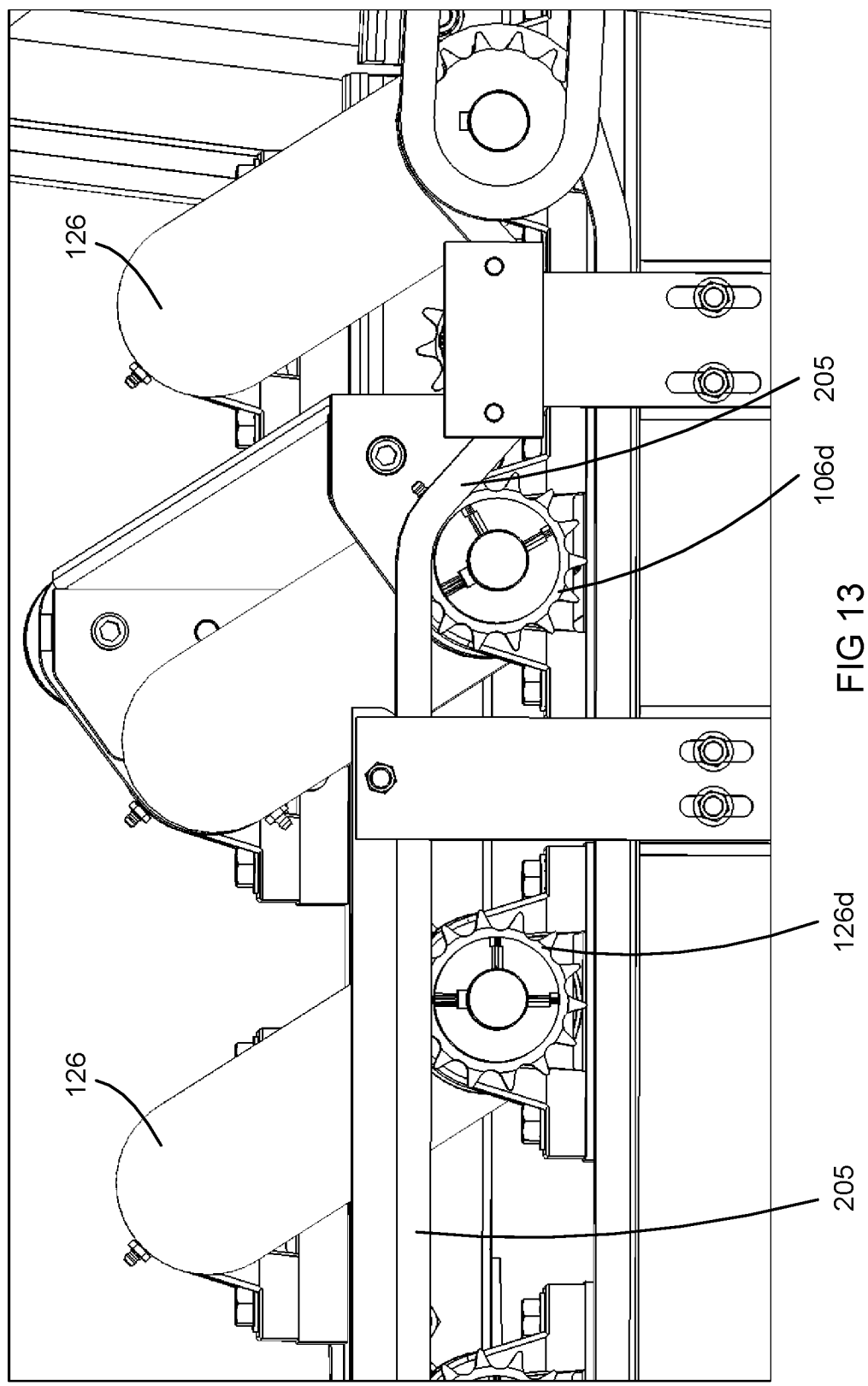
FIG. 13 shows an enlarged view of a portion of the infeed conveyor shown in FIG. 12.

FIGS. 10 and 12 illustrate perspective views of an actuator side and a chain side, respectively, of an example feed system 200 in accordance with various embodiments, with some conventional components hidden or removed for clarity. In this example, feed system 200 includes lapper assemblies 100 installed along an otherwise-conventional multi-deck veneer dryer infeed.

Feed system 200 may include a system frame 202 and one or more decks 204. Each deck(s) 204 may further include a deck frame 216 and conveyor rollers 126 arranged to form a workpiece support surface. The conveyor rollers 126 of each deck may be operatively coupled with a corresponding drive system 203 (FIG. 12). A lapper assembly 100 may be installed along at least one of the decks 204. Optionally, a conventional lapper device 214 may also be installed along at least one of the decks, as shown by way of example in FIGS. 10 and 11. In some embodiments a lapper assembly 100 may be installed upstream of a conventional lapper device 214 along each of the decks.

Figure 11:
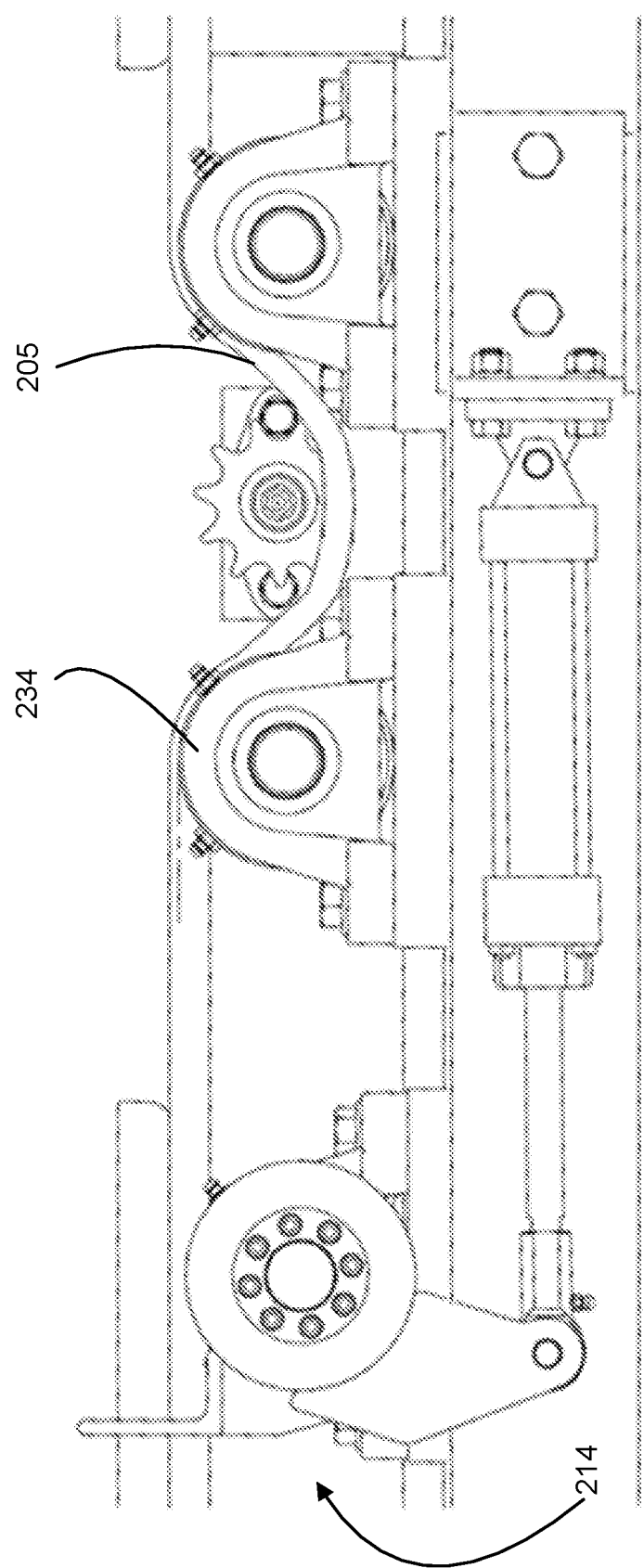
FIG. 11 shows an enlarged view of a portion of the infeed conveyor shown in FIG. 10.

The system frame 202 may include a plurality of steel beams, plates, and/or other rigid support structures coupled together to support the decks 204. Each deck frame 216 may include a pair of elongated supports, such as steel beams and/or plates, affixed to opposite sides of the system frame generally parallel to the direction of flow. Conveyor rollers 126 may be rotatably mounted to the supports of each deck frame at regular intervals from an infeed end 210 to an outfeed end 212 of the feed system 200. The conveyor rollers 126 may be mounted to the supports by conventional means, such as by bearing assemblies 234 (e.g., pillow block bearings) affixed to the supports of the deck frame. Some or all of the conveyor rollers 126 may have a sprocket 126*d* mounted to one end 126*b*, and the conveyor rollers may be arranged along the decks with the sprockets along one side (the 'drive side') of the feed system (FIGS. 11-12). The sprockets may engage a drive chain 205 of the corresponding drive system(s) 203, some or all of which may be located on the drive side of the feed system 200. The drive chain 205 may be coupled with a drive (e.g., a motor) configured to move the drive chain in rotation to rotate the sprockets, thereby rotating the conveyor rollers 126. Alternatively, the drive system may include a drive belt, rather than a drive chain, that rotates the conveyor rollers 126. In such embodiments the conveyor rollers 126 may lack sprockets. Regardless, each deck 204 may have a corresponding motor to drive the respective conveyor rollers. Alternatively, one motor may be used to drive the conveyor rollers of two or more decks Decks 204 may include one or more lapper assemblies 100. In various embodiments, roller 106 may be coupled to the deck frame in the same or similar manner as conveyor rollers 126 (e.g., by bearing assemblies 234 or the like). The other components of the lapper assembly 100 may be coupled to the roller 106 as described above. Optionally, a sprocket 106*d* may be mounted to one end of roller 106 to engage the drive chain that drives the conveyor rollers upstream/downstream of roller 106. In other embodiments, a separate drive (e.g., a servo motor) may instead be operatively coupled to roller 106. In still other embodiments, roller 106 may be freely rotatable but not operatively connected to a drive.

In various embodiments, the lapper assembly may be installed along a conveyor generally as follows. Roller 106 may be rotatably mounted to the frame by conventional means, such as by a pair of pillow block bearings mounted along end portions 106*b* and fixedly coupled to a support (e.g., the conveyor frame). Optionally, a conventional conveyor roller 126 may be removed from its position along the conveyor/deck (e.g., by uncoupling the pillow block bearings from the support and conveyor roller 126), and roller 106 may be installed in its place (e.g., by coupling the pillow block bearings to the ends 106*b* of the roller 106 and reattaching the pillow block bearings to the support in their former positions). As described above, all of the components of the lapper assembly may be assembled and coupled to the roller before mounting the roller to the support, or some of the components of the lapper assembly may be added after the roller 106 is mounted to the support. Likewise, actuator 102 may be coupled to the lever arm(s) and/or the support either before or after the roller 106 is mounted to the support. In some embodiments actuator 102 may also be coupled to a source of pressurized air, hydraulic fluid, or power/electricity. Optionally, roller 106 may be coupled to a different source of power, such as a drive chain/belt that drives one or more of the conveyor rollers 126, a servo motor, or the like. In some embodiments the lapper assembly may be installed along an existing conveyor as a retrofit or upgrade. Alternatively, the lapper assembly may be provided as a component of a new conveyor, and may be installed along with the conveyor rollers 126 as the new conveyor is assembled.

In operation, the conveyor rollers 126 (and optionally roller 106) are driven in rotation by the drive chain/belt to move a workpiece (e.g., a sheet of veneer) along the deck on the conveyor rollers. As the trailing end of the workpiece approaches the lapper assembly 100, the actuator 102 may be operated (e.g., extended) to move the stop member to the workpiece engaging position to thereby lift a trailing end of a workpiece 10 above the flow path on an upper edge surface of the stop member. In some embodiments, further movement of the workpiece 108 on the conveyor rollers may be halted while the lagging end is supported on the stop member (e.g., if the workpiece is less than 102 inches in length). Alternatively, forward movement of the workpiece may continue at the same speed, or at a lesser speed, while the lagging end is supported above the conveyor rollers on the stop member (e.g., if the workpiece is at least 102 inches in length). With the stop member still in the workpiece engaging position, the leading end of the next successive workpiece 10 may be conveyed into contact with a forward surface of the stop member, below the lagging end of the prior workpiece, and the actuator 102 may be operated (e.g., retracted) to return the stop member to the workpiece disengaging position to thereby lower the trailing end of the first workpiece onto the leading end of the subsequent workpiece. In various embodiments, the stop member may be rotated approximately 45 degrees (plus or minus 5 degrees) around the rotational axis of the roller 106 to move from the workpiece engaging position to the workpiece disengaging position or vice versa.

Optionally, one or more of the decks 204 may include a conventional lapper device 214 in addition to the lapper assembly 100. As previously described, the conventional lapper device 214 (FIG. 11) may include a stop member rigidly affixed to a corresponding roller. In such embodiments the conventional lapper assembly 214 may be a component of an existing infeed, and lapper assembly 100 may be installed in place of a conventional roller 126 either upstream or downstream of the conventional lapper assembly. Optionally, some or all of the lapper assemblies 100 and/or lapper devices 214 may be operatively coupled to corresponding actuators, which may in turn be coupled to a source of pressurized air or fluid.

The lapper assemblies 100 may be positioned at any desired distance from the input end, from another lapper assembly, or from any other reference location. The desired number and spacing of lapper assemblies may be determined based on the length(s) of the workpieces, the width(s) of the workpieces, a desired amount of overlap of the workpieces, the number of different workpiece sizes to be handled, and/or some combination thereof. For example, in some embodiments a lapper assembly 100 may be positioned approximately four feet (plus or minus six inches) from the input end of a deck 104, and a conventional lapper device 214 (or another lapper assembly 100) may be positioned approximately eight feet (plus or minus six inches) from the input end of the same deck, to enable lapping of eight-foot and four-foot long workpieces, respectively. Alternatively, a lapper assembly 100 may be positioned at a greater distance from the input end to lap longer workpieces, or nearer to the input end to lap shorter workpieces. In other embodiments a series of lapper assemblies 100 may be positioned at regular intervals along a conveyor/deck and operated selectively to lap workpieces of different or random sizes or lengths, or to lap workpieces at different conveyance speeds, or the like. In still other embodiments, rollers 106 may be positioned at regular intervals along a conveyor/deck, and the remaining components of lapper assembly 100 may be moved from one roller 106 to another to lap workpieces of different lengths as needed (e.g., to lap four-foot long workpieces one day and eight-foot long workpieces the next day).

In some embodiments, a lapper assembly of one deck may be located at a different distance from the input end (or other reference location) than a corresponding lapper assembly of another deck. For example, an upstream-most lapper assembly of a first deck may be positioned in a certain location to overlap workpieces of a first length (e.g. located approximately four feet from the input end to lap workpieces that are approximately 4 feet long), whereas the upstream-most lapper assembly of a second deck may be positioned in a different location to overlap workpieces of a second length (e.g. located approximately eight feet from the input end to lap workpieces that are approximately eight feet long). In these embodiments, workpieces of the first length may be directed to and conveyed across the first deck, whereas workpieces of the second length may be directed to and conveyed across the second deck.

While the illustrated embodiment of a feed system is configured for use as a veneer dryer infeed, in other embodiments a feed system may be configured for use as a veneer dryer outfeed, or as infeed or outfeed for other machinery (e.g., stackers, unstackers, dryers for other sheet materials, etc.). Further, while the illustrated feed system includes six decks of generally similar configuration, the number and configuration of decks may vary among embodiments. Other embodiments may have one, two, three, four, or five decks, or more than six decks, or decks with different features/configurations (e.g., different numbers/types of lapping assemblies, conveyor rollers, drive systems, etc.).

Figure 14:
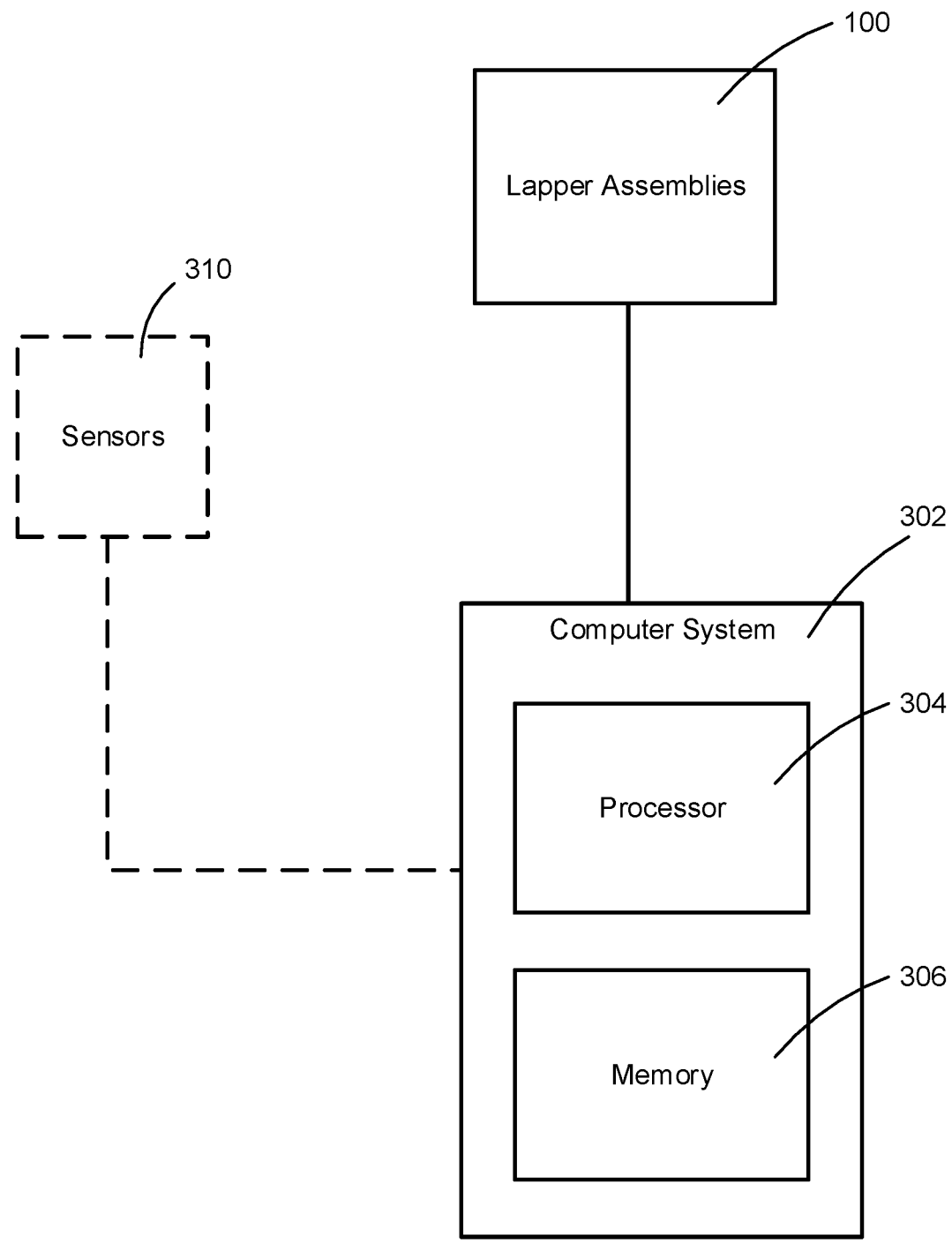
FIG. 14 illustrates an example of a computer device for use to operate the lapper assembly(ies), all in accordance with various embodiments.

FIG. 14 illustrates a block diagram of an example computer system 302 configured for use to operate the lapper assemblies (e.g., lapper assemblies 100), in accordance with various embodiments. The computer device may include a processor 304 and a memory 306. The processor 304 may be a central processor unit (CPU). The memory 306 may include volatile and/or non-volatile memory devices. The memory 306 may include instructions stored thereon that are operable, in response to execution by the processor device 304, to cause the computer device 302 to perform certain operations (e.g., to operate actuator 102, drive 203, an actuator operatively coupled with roller 106, and/or an actuator operatively coupled with a conventional lapper device 214). In various embodiments, computer system 302 may be (or may include) a personal computer, laptop, smartphone, and/or programmable logic controller (PLC).

The computer system 302 may be communicatively coupled to the lapper assemblies. In embodiments that include both a conventional lapper device (e.g., lapper device 214) and a lapper assembly (e.g., lapper assembly 100), the computer system may be communicatively coupled to both the lapper device(s) and the lapper assembly(ies). The computer system 302 may be programmed to control the lapper assemblies. For example, the computer system 302 may be programmed to cause a hydraulic system to provide fluid (e.g., air, hydraulic fluid, oil, etc.) to an actuator (e.g., actuator 102) to thereby cause the actuator to move the stop member from the workpiece engaging position to the workpiece disengaging position or vice versa. As another example, the computer system 302 may be programmed to cause a servo motor or other type of actuator to move the stop member from the workpiece engaging position to the workpiece disengaging position or vice versa.

In some embodiments, the computer system 302 may be communicatively coupled to one or more sensors 310 positioned to detect the workpieces along the conveyor or feed system. The sensors 310 may include vision/optical sensors (such as laser and/or light sensors, photo-eyes, proximity sensors, cameras, etc.) operable to detect workpieces as they are conveyed across corresponding positions along the conveyor or feed system, weight sensors coupled to corresponding rollers (e.g., 106 or 126) and configured to detect additional weight on the rollers, pressure or impact sensors configured to detect a workpiece contacting a stop member (e.g., stop member 118), or any combination thereof. The computer system 302 may control the lapper assemblies, either directly or indirectly via a programmable logic controller (PLC), based at least in part on the data received from the sensors 310.

In some embodiments, the computer system 302 may be configured to control the lapper assembly based on one or more factors such as time, workpiece length, and/or conveyor speed. For example, the computer system may determine the appropriate intervals at which to move the stop member to the workpiece engaging position, and to the workpiece disengaging position, based on a combination of workpiece length and conveyor speed. Such intervals may be defined in a look-up table stored in the memory of the computer system, or calculated by the computer system based on operator inputs of speed/product length values, or determined by the computer system based on data from sensors 310. In embodiments with multiple lapper assemblies, the computer system may be configured to operate each of the lapper assemblies independently. Alternatively, the computer system may be configured to operate at one of the lapper assemblies based on the operation of another (e.g., to actuate one lapper assembly a defined length of time after actuating another lapper assembly). In some embodiments, the computer system may be configured to adjust the speed of rotation of roller(s) 106 based at least in part on the position of the stop member(s), or vice versa.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

The invention claimed is:

1. A lapper assembly, comprising:
   a first and a second bearing mount, each of the bearing mounts having an inner face, an outer face, and a first aperture that extends through the faces;
   an elongated stop member with a first end and an opposite second end; and
   a lever arm fixedly coupled to, or configured to be fixedly coupled to, the outer face of the first bearing mount at a location that is offset from the respective first aperture along the outer face of the first bearing mount, such that the lever arm is fixed in position relative to the first bearing mount, wherein the inner faces of the bearing mounts are configured to be removably coupled to the first and second ends, respectively, of the elongated stop member to form a stop member assembly in which the elongated stop member extends between the bearing mounts with said apertures in alignment along an axis that extends through the apertures.

2. The lapper assembly of claim 1, wherein the stop member includes an elongated plate and first and second end members coupled to respective ends of the elongated plate and oriented transverse to the elongated plate, and wherein the elongated plate is angular or curved in cross-section.

3. The lapper assembly of claim 2, wherein each of the end members has an outer edge, a first portion of the outer edge is connected to the elongated plate, and a second portion of the outer edge has a recess, and wherein the recesses are configured to extend partially around the axis when the elongated stop member and the bearing mounts are coupled together to form said stop member assembly.

4. The lapper assembly of claim 1, further including a lapping roller with a middle portion and first and second end portions that are smaller in diameter than the middle portion, wherein said first apertures are dimensioned to accommodate the respective end portions of the lapping roller and the length of the middle portion is less than the length of the stop member.

5. The lapper assembly of claim 4, wherein at least one of the end portions of the lapping roller is coupled with a sprocket configured to engage a drive chain of a drive system.

6. The lapper assembly of claim 1, further including an actuator operatively coupled with the lever arm, such that the actuator is operable to pivot the stop member assembly in opposite rotational directions about the lapping roller.

7. A conveyor system for moving materials along a flow direction, comprising:
a frame;
a plurality of first rollers rotatably coupled to the frame and disposed at intervals along the flow direction;
a second roller rotatably coupled to the frame generally parallel to the first roller; and
a lapper assembly pivotably coupled to the second roller, wherein the lapper assembly includes a stop member assembly having
an elongated stop member with a first end and an opposite second end,
a first and a second bearing mount removably coupled to the respective first and second ends, respectively, of the elongated stop member, each of the bearing mounts having an inner face, an outer face, and a first aperture that extends through the faces, and
a lever arm fixedly coupled to the outer face of the first bearing mount at a location that is offset from the respective first aperture along the outer face of the first bearing mount, such that the lever arm is fixed in position relative to the first bearing mount,
wherein a middle portion of the second roller is disposed between the ends of the stop member and first and second end portions of the second roller are disposed through respective ones of the first apertures, such that the lapper assembly is pivotable about the second roller between a workpiece engaging position, in which the stop member extends above an upper surface of the second roller, and a workpiece disengaging position, in which the stop member is below said upper surface.

8. The conveyor system of claim 7, further including an actuator coupled to the frame and the lever arm, wherein the actuator is selectively actuable to pivot the stop member assembly relative to the second roller.

9. The conveyor system of claim 7, wherein the lever arm is rigidly coupled to the first bearing mount by a shaft that is substantially perpendicular to the lever arm and the first bearing mount.

10. The conveyor system of claim 7, wherein the first roller has respective middle and end portions, and wherein the end portions of the second roller are longer than the end portions of the first roller or the middle portion of the second roller is shorter than the middle portion of the first roller.

11. The conveyor system of claim 7, further including a drive system coupled with the first roller and selectively operable to drive the first roller in rotation.

12. The conveyor system of claim 11, wherein the first rollers have respective first ends with respective first sprockets, and the first end portion of the second roller has a second sprocket, and wherein the drive system includes a drive chain and a motor operatively coupled with the drive chain, and the first sprockets and the second sprocket are operatively coupled with the drive chain.

13. The conveyor system of claim 12, further including an actuator coupled to the frame and the lever arm, wherein the actuator is selectively actuable to pivot the stop member assembly relative to the second roller.

14. The conveyor system of claim 13, further including a computer system configured to control the actuator based on data from one or more sensors operable to detect workpieces on the first rollers or the second roller.

15. The conveyor system of claim 13, further including a computer system configured to control the actuator based on workpiece length and a transport speed of the workpieces.

16. A method of modifying a roller conveyor, wherein the roller conveyor includes a plurality of first rollers rotatably coupled to a frame, the method comprising:
pivotably coupling a lapper assembly to the frame, wherein the lapper assembly includes
an elongated stop member with a first end and an opposite second end,
a first and a second bearing mount removably coupled to the respective first and second ends, respectively, of the elongated stop member, each of the bearing mounts having an inner face, an outer face, and a first aperture that extends through the faces,
a second roller with a middle portion and opposite end portions, and
a lever arm fixedly connected to the outer face of the first bearing mount, such that the lever arm is fixed in position relative to the first bearing mount,
wherein the ends of the second roller are disposed through the first apertures, and pivotably coupling the lapper assembly to the frame includes rotatably mounting the ends of the second roller to the frame, substantially parallel to the first rollers, such that the first and second rollers form a support surface, and the stop member and bearing mounts are pivotable about the second roller between a workpiece engaging position, in which the stop member extends above an upper surface of the second roller, and a workpiece disengaging position, in which the stop member is below said upper surface.

17. The method of claim 16, further including coupling an actuator to the frame and the lever arm, such that the actuator is operable to pivot the stop member and the bearing mounts around the second roller.

18. The method of claim 16, further including coupling the second roller to a drive system of the roller conveyor, such that the drive system is selectively operable to rotate the second roller and one or more of the first rollers in unison.

19. The method of claim 16, wherein the stop member includes an elongated plate that is angular or curved in cross-section and first and second end members coupled to respective ends of the elongated plate and transverse thereto, and wherein each of the end members has an outer edge, a first portion of the outer edge is connected to the elongated plate, and a second portion of the outer edge has a recess that extends partially around the respective one of the end portions of the second roller.

20. The method of claim 17, further including coupling the actuator with a computer system configured to control the actuator based at least on data from one or more sensors positioned to detect workpieces on the conveyor.

* * * * *